July 22, 1941.    J. KRAL    2,249,902
SNAP FASTENER STUD MEMBER
Filed May 23, 1939    2 Sheets-Sheet 1
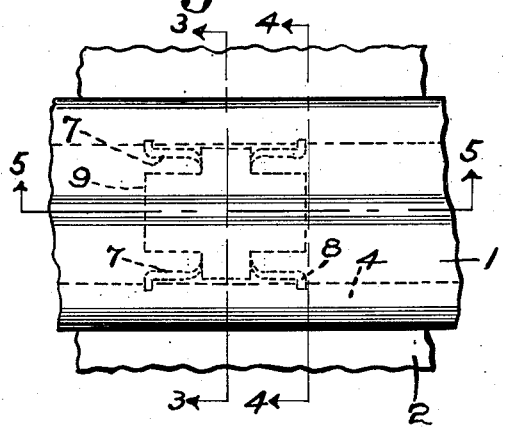
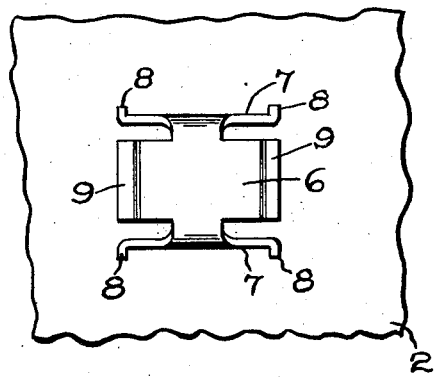
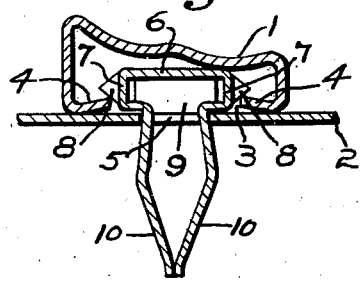
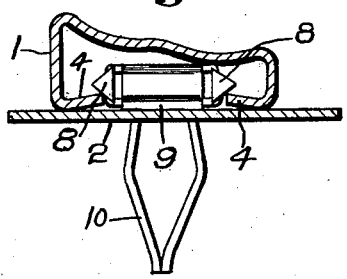
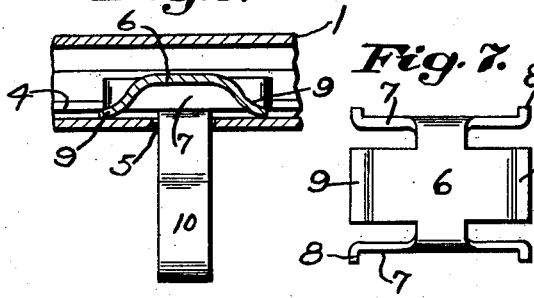
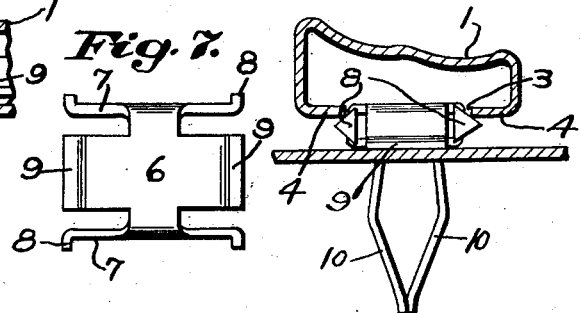
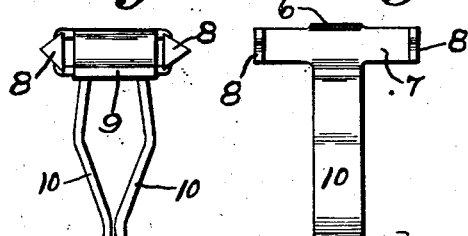
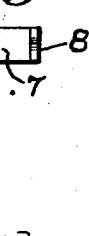
Inventor:
Joseph Kral.
by Walter J. Jones Att'y.

July 22, 1941.     J. KRAL     2,249,902
SNAP FASTENER STUD MEMBER
Filed May 23, 1939     2 Sheets-Sheet 2

Inventor:
Joseph Kral.
by Walter P. Jones
Att'y.

Patented July 22, 1941

2,249,902

UNITED STATES PATENT OFFICE 2,249,902

SNAP FASTENER STUD MEMBER

Joseph Kral, Cambridge, Mass., assignor to United-Carr Fastener Corporation, Cambridge, Mass., a corporation of Massachusetts Application May 23, 1939, Serial No. 275,186

1 Claim. (Cl. 24—73)

My invention relates to improvements in snap fastener stud members for securing a molding to a support by a double snap action.

In the drawings, which illustrate preferred embodiments of my invention:

Fig. 1 is a plan view of an installation showing an apertured part, such as a molding strip, secured to a supporting structure by means of one form of my improved fastener member shown in dotted lines;

Fig. 2 is a plan view similar to Fig. 1 but with the molding strip omitted;

Fig. 3 is a section taken on the line 3—3 of Fig. 1;

Fig. 4 is a section taken on the line 4—4 of Fig. 1;

Fig. 5 is a section taken on the line 5—5 of Fig. 1;

Fig. 6 is a view of the part like Fig. 4 but showing the molding as it appears when being snapped into place;

Fig. 7 is a front plan of my fastener member per se;

Fig. 8 is an end view of my fastener member per se;

Fig. 9 is a side view of my fastener member per se;

Figure 10:
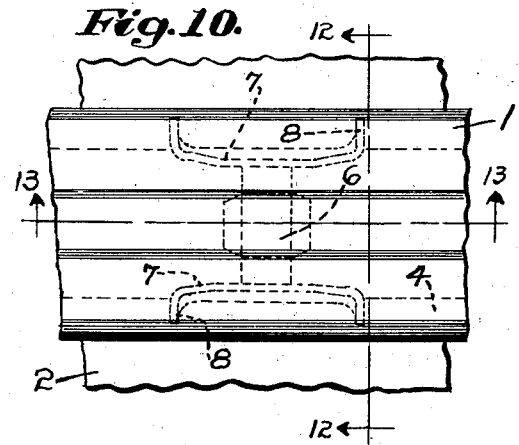
Fig. 10 is a view similar to Fig. 1 showing a second form of my improved fastener in dotted lines.
Figure 11:
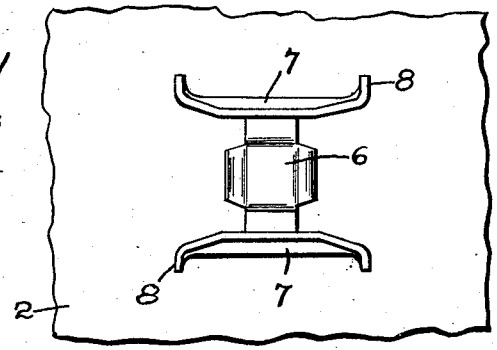
Fig. 11 is a view of the installation shown in Fig. 10 with the molding being omitted.

My invention, as illustrated in the accompanying drawings, relates to a double-headed fastener member particularly, though not exclusively, adapted to be used in fastener secured installations in which a part such as a hollow molding and the like may be quickly and efficiently secured to a supporting structure such as an automobile body. The particular installations shown in the drawings which I have chosen to illustrate the use of my improved fastener members each comprises a part such as a molding strip 1 of the type which is now frequently used on the bodies of automobiles and elsewhere and another part such as a relatively thin supporting plate 2, as shown in Figs. 1 and 10. It should be understood, however, that my improved fastener members may be satisfactorily used for attaching other parts together than those specifically illustrated in the drawings. The molding strip 1, in my preferred form, has an aperture 3 running longitudinally of one of its sides and inwardly-bent flanges 4—4 provided adjacent the aperture 3. The supporting structure 2, which is preferably of thin metal material, is provided with an aperture 5 of circular shape to receive a snap fastener portion of one of my fastener members.

Assembly of the component parts of either of the installations described above may be accomplished by preferably first snapping the legs of the fastener member through the aperture 5 of the supporting structure 2. Then the molding strip is snapped over the top part of the fastener by pressing the molding strip directly against the exposed fastener portion.

Referring first to the particular snap fastener shown in Figs. 1 through 9, inclusive, I have shown a fastener formed from a single piece of sheet metal. The fastener is provided with a top portion 6 which has a pair of side portions 7—7 connected to the top portion at opposite sides thereof and bent at right angles to the general plane of the top portion, as shown in Figs. 2 and 3. The ends 8—8 of the side portions are bent as shown in Fig. 2 so that with these ends the side portions are substantially U-shaped. The ends 8—8 are preferably triangular-shaped (Figs. 3 and 4) to provide diverging and converging relative portions when one end portion 8 of one of the side portions 7 is taken into consideration with the opposite end portion 8 of the other side portion 7. The fastener is also provided with a pair of spacing elements 9—9 extending from the top portion 6 between the side portions 7—7, as shown in Figs. 2 and 5. These spacing portions curve downwardly and outwardly so that their free ends extend slightly farther from the top portion 6 than the lower edges of the side portion 7, as clearly shown in Fig. 5.

The fastener is also provided with a pair of legs 10—10 preferably connected to the lower edges of the side portions 7—7 and first extending toward each other from those side portions and then extending downwardly in bowed relationship to each other with their ends preferably in contact, or substantially so, in the normal position of the legs. These legs provide one of the portions of the double snap fastener element and the top sides and spacing members cooperate to provide the other snap fastener portion of the double snap fastener portion.

In order to assemble a molding 1 to a support such as the sheet metal piece 2, I first prefer to snap one of my fasteners into the hole 5 in the support 2 by pressing the legs 10—10 through the aperture as shown in Fig. 3. Of course the fastener has to be snapped into the aperture 5 in such a manner that the side portions 7—7 will be parallel with a line through the series of apertures 5 over which the molding 1 is to be placed. Thus the other snap fastener portion is exposed for reception of the molding 1 as shown in Fig. 2. Next, the molding is put into position above the exposed part of the fastener, as shown in Fig. 6, and pressure is applied. This action brings the edges of the inturned portions 4—4 of the molding into contact with the diverging surfaces of the end portions 8—8 of the sides 7—7. Since the upper snap fastener portion is resting upon the supporting member 2 in such a way that the spacing members 9—9 are in contact with the support 2, as shown in Fig. 5, the sides 7—7 are free to yield without interference from the support. The ends 8—8 of the sides 7—7 are freely yieldable so that they may pass through the opening 3 in the bottom of the molding 1 and the edges of the inturned portions engage with the converging portions of the ends 8—8 as shown in Figs. 3 and 4. Thus the molding is held securely in place and is furthermore held tightly against the support 2 due to the fact that the lower sides of the ends 8—8 converge thus adapting themselves to variations in thickness of the inturned portions of the molding 1. My improved fastener though appearing to be composed of many portions is really quite simple to manufacture and the many portions permit greater utility in a device of this nature due to the fact that the portions operate more or less independently of each other and adapt themselves to varying conditions.

Figure 12:
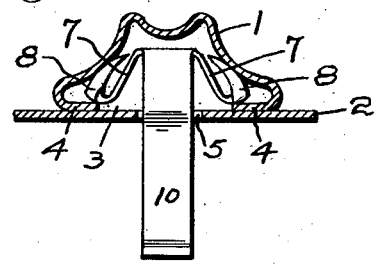
Fig. 12 is a section taken on the line 12—12 of Fig. 10.
Figure 13:
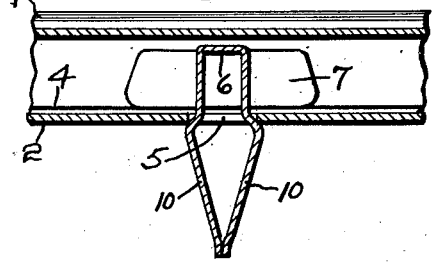
Fig. 13 is a section taken on the line 13—13 of Fig. 10.
Figure 14:
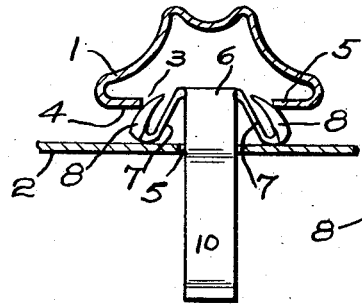
Fig. 14 is a section like Fig. 12 but showing the molding in the act of being snapped into position.
Figure 15:
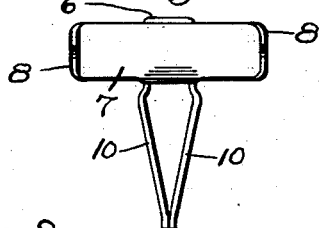
Fig. 15 is a side view of the fastener per se shown in Figs. 10, 11, 12, 13 and 14.
Figure 16:
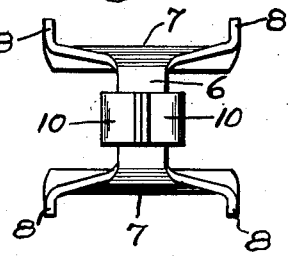
Fig. 16 is a bottom plan view of the stud per se shown in Fig. 15.

Referring now to the particular fastener shown in Figs. 10 through 16, inclusive, there is illustrated a snap fastener of the double snap type formed from sheet metal and having the general characteristics of the fastener just illustrated and described in connection with Figs. 1 through 9, inclusive, except that the arrangement of the parts is slightly different. In this particular fastener the legs 10—10 are connected directly to opposite sides of the top 6, as best shown in Figs. 12 and 16. The side portions 7—7 are joined to the top portion in substantially the same manner as in the first described fastener but since the legs 10—10 are not connected to the side portions there is more independence of action of these two elements than there is in the first described form because of the fact that both may act independently of the other without affecting the functions of the other. Instead of providing independent spacing portions as those portions 9—9 of the first described fastener, the fastener shown in Figs. 10 through 16, inclusive, has the side portions so shaped and arranged at their lower edges with respect to the end portions 8—8 that the side portions themselves act as the spacing means permitting the inturned edges of the portions 4—4 of the molding 1 to ride down over the diverging portions of the edges 8—8 and snap under the converging portions, at the same time lifting the side portions from their position shown in Fig. 4 to the position shown in Fig. 12 to secure a tight engagement of the parts.

The portions of the fastener shown in Figs. 10 through 16, together with the other elements of the installation, are given the same numbers as the corresponding portions of the fastener and cooperating elements described in connection with Figs. 1 through 9.

While I have illustrated and described preferred embodiments of my invention, I do not wish to be limited thereby because the scope is best defined by the following claim.

I claim:

A double snap fastener stud for moldings and the like comprising, in combination, a top portion, a pair of bowed legs extending from said top portion in a direction normal to the plane of said top portion to provide one snap stud, a pair of U-shaped side portions joined to said top portion adjacent to mid-portions of the bottom of each U, each of said U-shaped side portions having legs with tapering shoulders at their free ends and the legs on one U-shaped portion extending in an opposite direction from the legs of the other U-shaped portion to cooperate with each other for snap fastening engagement with said molding, the said U-shaped portions being resilient so that the leg of one may yield toward the leg of the opposite side portion and from the other snap stud.

JOSEPH KRAL.